Jan. 9, 1951 L. D. STONER 2,537,488
FLY CASTING ROD
Filed Dec. 16, 1946
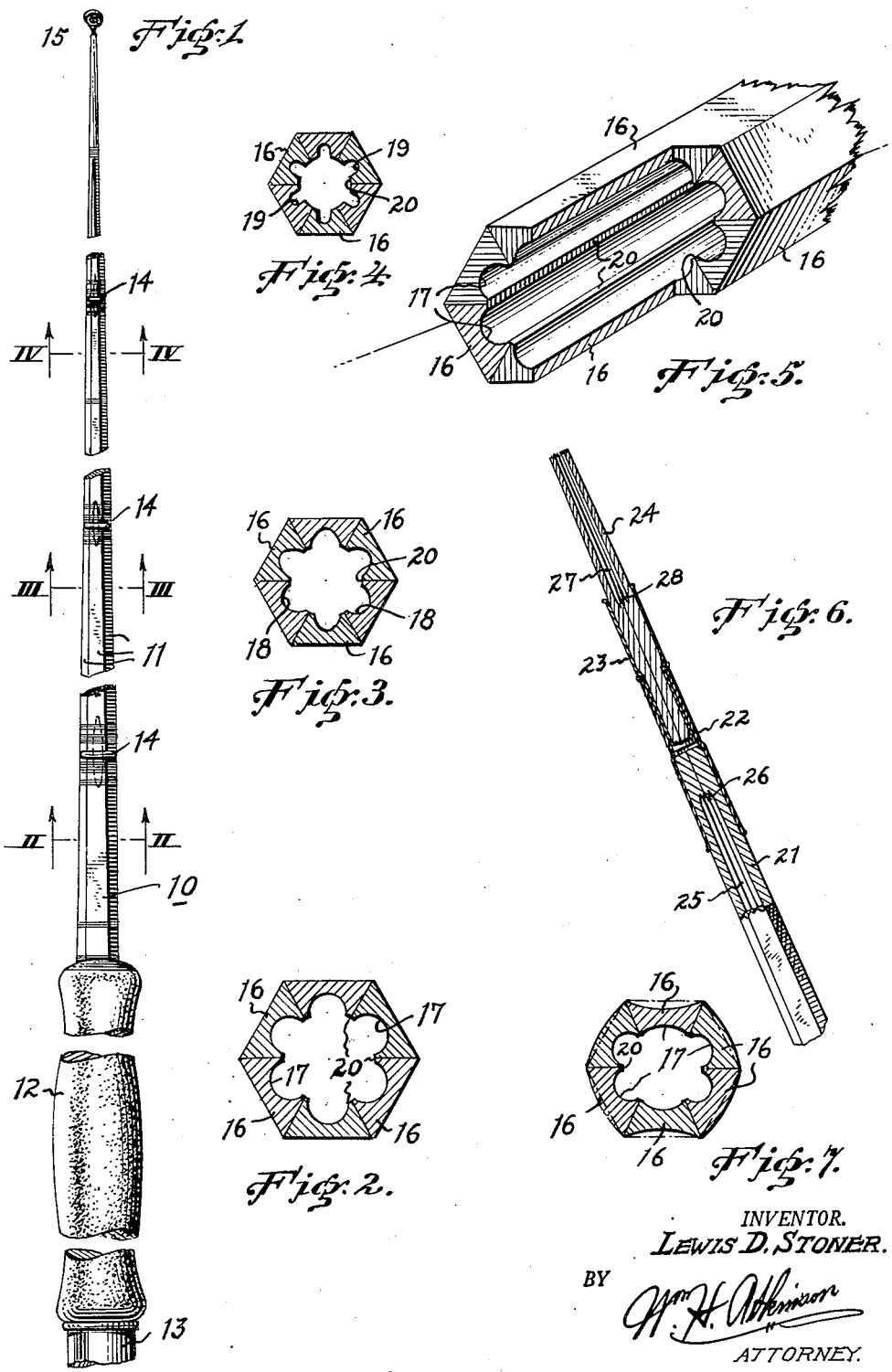
INVENTOR.
LEWIS D. STONER.
BY
ATTORNEY.

Patented Jan. 9, 1951

2,537,488

UNITED STATES PATENT OFFICE 2,537,488

FLY CASTING ROD

Lewis D. Stoner, San Francisco, Calif., assignor to The R. L. Winston Rod Co., San Francisco, Calif., an association Application December 16, 1946, Serial No. 716,490

6 Claims. (Cl. 43—18)

The present invention relates to fishing rods and more particularly to fishing rods of the so-called fly and bait-casting type.

The main object of my invention is to provide an improved fly-casting rod of greater strength and lightness and one in which the action thereof is controlled in a new and novel manner.

Another object of the invention is to provide a fly-casting rod of hollow construction in which a plurality of segmental splines are glued together longitudinally and so formed that when completed the rod will have a cavity of varying cross sectional area extending longitudinally therethrough to thus determine the active characteristics of the rod.

Another object of the invention is to provide a fly-casting rod of hollow construction in which the interior chamber of the rod is varied in cross sectional area in a predetermined manner as the tip of the rod is approached.

A further object of the invention is to provide a method of manufacturing by which fly-casting rods having any desired strength, degree of flexibility and action may be produced.

Other objects and advantages of the invention will be in part evident to those skilled in the art and in part pointed out hereinafter in connection with the accompanying drawing, wherein there is shown by way of illustration and not of limitation a preferred embodiment thereof.

In the drawing:

Figure 1 shows a fly-casting rod constructed in accordance with the invention and with parts broken out to foreshorten the view, Figures 2, 3 and 4 are transverse sectional views taken along the rod shown in Figure 1, at the corresponding section indicating lines and looking in direction of the arrows, Figure 5 is a fragmentary perspective view with portions cut away to illustrate the interior construction of my improved rod, Figure 6 is a fragmentary sectional view showing a modified form of the invention, and Figure 7 is an exaggerated sectional view corresponding to that of Figure 2 of the drawing.

In the use and manufacture of a fly-casting rod and particularly one used in fly-casting tournaments, the action of the rod is a controlling factor, and since it is the purpose of the present invention to provide a casting rod which will give the greatest satisfaction to the lay fly-caster and the tournament expert, it is believed that a brief outline of this characteristic of the present invention should be given prior to the more specific description of the structural features of the invention.

By the adoption of a natural bamboo cane as a fishing rod fishermen obtained a tubular structure which technically approached the ultimate in lightness and other desirable characteristics, but when the art took to the manufacture of fishing rods by splitting the natural bamboo cane and glueing and otherwise securing together splints of this material there was provided a pole which, while of more uniform appearance, did not retain the desirable action characteristics of the natural cane. This is due to the fact that these split bamboo rods were of solid construction and thus while of smaller diameter they were in the main of stiffer construction and of considerably more weight than is desired in a light fly-casting rod. To remedy this I propose by my present invention to provide a split cane rod of hollow construction which will have all of the advantages of a natural cane rod, both with respect to symmetry, balance and action, without its attendant objectionable features.

The action of a fly-rod in casting is quite complex as the only weight cast is that of the line itself. In this operation it is a prerequisite that the line be fully extended to drop straightened on the water. To accomplish this the line must be gradually paid out from the rod with alternate casts forward and back so that it is kept fully extended until the caster decides to let it drop upon the water. Unless upon all back casts the line extends fully in the air, no subsequent cast can be made, as the inertia of the line will resist the effort of the caster and thus prevent him from imparting a sufficient casting velocity to the line. For example, when the caster applies a casting effort against a line thus oppositely extended the whole line will be pulled upon and put in motion as a unit by his casting effort. Whereas, if the line becomes kinked or curved or coiled, this casting effort will be largely or wholly lost and/or uselessly expended in straightening the line. This casting effort must also be completed before the inertia of the line can effectively resist the caster and thus prevent the line as a whole or as a unit from having a sufficient casting velocity imparted to it.

A line thus back cast and cast must alternately have oppositely directed forces applied thereto, to extend it alternately in opposite directions, and thus reverse its direction of motion by flowing in a small loop or semi-circle upon itself. This semi-circle or loop as it is usually called, begins at the tip of the fly-rod and runs out on the line as the latter straightens. The effect resembles the capital letter U; when cast the line is fully extended and straight, then as it begins its motion in the opposite direction a horizontal U is formed with one limb very short and the other limb almost the whole length of the line. Now as the cast proceeds the short limb of the U lengthens and the long limb shortens in a continuously progressing flow of the curve of the U along the line, until finally the line flies out straight again. The diameter of the loop will be largely governed by the degree to which the rod bends while being cast, and how far down on the rod the bend extends. This bending of the rod also enables it to absorb all the shocks from starting and stopping the line in its to-and-fro motions in the back and the forward casts. From this it will be seen that the shape assumed by the bend in the rod, as regards the effectiveness of the rod in transmitting the force of the caster's effort into the cast itself, is a matter of great moment. This bend may take the form of a parabolic or a helical curve, or even of a semi-circle, or a composite of all of these various curves.

The matter of providing for the proper curvature to the bend of a rod, and varying that curvature according to the result to be attained in the casting of the line, is an important part of the fly-rod maker's art. This is known as the "action" of the rod, and usually is distinguished as "wet-fly action", "dry-fly action", "distance-cast action", and other terms. When applied to the various rods made for these specific kinds of fly-fishing and casting, the action of a rod may also be defined as "Pronounced", "Moderate" or "Medium". Other modifications of the specific "actions" may also be obtained by taking into account the following factors: A large diameter rod offers more resistance to movement in the air than does one of a smaller diameter; a greater local specific gravity or weight in the rod offers more inertia than does a lesser weight; and a greater stiffness in the rod offers more resistance to flexion than does a more flexible rod.

In other words, as will be understood from the above, a determining factor for controlling the curvature which a rod will take when casting, is its resistance to movement through the air and its weight and flexibility at various points throughout its length. Another and even more controlling factor in the action of the rod resides in its inertia, not only as a whole, but in each of several zones throughout its length.

Heretofore, with rods made of solid cane the above bending development under casting effort could only be controlled by varying the diameter and taper of the rod. The specific gravity of the cross section was invariable, it being solid cane, homogeneous throughout the rod's length. Air resistance was also an invariable accompaniment at a given diameter and flexibility at any given point was controllable only by diameter. In other words, a solid rod of a given taper and diameter would have a definite specific action, which could not be changed by further external modification in design or construction.

As distinguished from the prior art rods, the action of my improved fluted-hollow rod may be controlled at all points in its length as to stiffness, specific gravity and active cross section, by varying the depth, radius and shape of the fluting at any point therealong, and thus a rod may be designed to give any desired casting curvatures and action far more completely and exactly than can be obtained by any other method or construction. Therefore, with a given weight limit, the rod manufacturer can produce a larger, stronger and more flexible rod than is possible with solid cane, or other hollow construction. In addition, the relation of weight to diameter and the relation of flexibility to length, or to weight, or to both weight, diameter and length, may be controlled at any point along the length of a rod.

Upon now referring to Figure 1 of the drawing, it will be seen that my improved rod, designated by the numeral 10, comprises a splined shaft 11 that extends outwardly from a grip 12 and at the butt of the grip 12 there is a suitable reel accommodating mounting 13 of conventional design. With respect to the reel mounting 13 it will of course be understood that the accommodation for a reel may, if desired, be interposed between the shaft 11 and the grip 12 as is the customary practice with bait casting rods. The shaft 11 of the rod is also here shown as provided with conventional line guiding eyelets 14 and a tip 15. In this showing the shaft 11 of the rod 10 is of hexagonal form and is composed of six segmental splines of trapezoidal cross-section which when secured together and wound in the conventional manner will produce a hollow rod that will have all the appearance of a solid rod, but with an action and other desirable characteristics which will not become apparent until the rod is taken in hand by a user.

Reference is made to Figures 2, 3 and 4 of the drawing, for a more detailed description on the novel characteristics of my improved rod. In these showings it will be noted that the individual splines of the shaft 11, here designated by the numeral 16, are mitered so that when six of these splines are assembled as shown they will provide a rod of hexagonal form. In order to provide the rod 10 with the improved action and other novel characteristics as contemplated by my invention these figures of the drawing also show each of the several splines 16 of the shaft 11 as being routed out or grooved longitudinally along their inner surfaces so as to form what has been referred to as a fluting that extends throughout substantially the entire length of the shaft 11. This routing or fluting, designated by the numeral 17, in Figure 2 of the drawing, is shown as semi-circular in shape, whereas in Figure 3 of the drawing this routing or fluting, further designated by the numeral 18, is shown as having substantially elliptical outline, while in Figure 4 of the drawing this routing or fluting, here designated by the numeral 19, is shown as in the form of a narrow groove with parallel side walls. In connection with this showing of the fluting at 17, 18 and 19, it will be understood that they all form different zones of one continuous flute that extends throughout the active parts of the rod 10. Therefore, when the splines 16 are secured together in the manner shown, they form the outline of a chamber or channel having different diameters and/or configurations throughout the length of the pole 10. In this manner it is possible to vary the weight, flexibility and action of the shaft 11 to produce any desired action and type of rod desired. For example, with the semi-circular fluting 17 at the base of the rod, where the shaft 11 is of large diameter, there is imparted some flexibility which would not be present if the splines 16 were not routed out or fluted in the manner suggested. At the same time this routing or fluting 17 will reduce the weight of the shaft 11 to a considerable extent at this point. By the same token with the form of fluting 17, shown in Figure 3, there will be provided a proportional degree of flexibility and a corresponding reduction in weight of the rod without at the same time unnecessarily weakening the rod at this point as would be the case if the semi-circular fluting 17 of Figure 2 were carried through this particular portion of the rod. Similarly as the tip of the shaft 11 is reached it has been found that while the fluting may extend to substantially a corresponding depth and thus provide a wall thickness at the bottom thereof corresponding to the wall thickness at the bottom of the flutings 17 and 18 of Figures 3 and 4 of the drawing, these latter flutings are made narrower in order that the required strength at this smaller diameter portion of the rod is not lost.

To carry the above description further, it will be seen that by properly shaping and proportioning the depth of the flutings 17, 18 and 19 that a substantially uniform minimum thickness of the individual splines 16 may be obtained throughout the length of the shaft 11. By the same token, the depth and configuration of the fluting at the points 17, 18 and 19 may be also proportioned to provide for a substantially uniform depth of glueing surface between the adjacent splines 16 at their mitered edges. In a like manner, if diameter of the flutings 17, 18 and 19 is reduced there may be provided a greater thickness of the splines 16 immediately adjacent their mitered edges so that in effect there may be provided a series of longitudinally extending ribs 20, as is more clearly shown in Figure 5 of the drawings, which in addition to providing for a wide glueing surface will also impart additional stiffness to the pole where desired.

When a fluting such as is indicated in Figures 2, 3 and 4 of the drawing is provided within a rod, it will be understood that the fluted outlines 17, 18 and 19 will form one continuous flute and intermediate the points where there sectional views have been taken the fluting will have a configuration and/or shape which will vary from one to the other extreme in a gradual manner and not by any abrupt change in the shape thereof. Instead of having these definite variations in configuration it will be understood that these flutings may be formed of the same general configuration but of varying dimension in width and depth as they progress along the length of the rod. In extremely long rods the flutings may taper away to a point where the individual splines at the tip end of the rod will have no fluting at all.

While I have in the previous figures of the drawing described and shown my invention as embodied in a rod of the unjointed type, it will be understood that the rod may be formed in several lengths which can be assembled in the conventional manner. With such a rod as shown in Figure 6 of the drawing, the sections or separable lengths will be equipped with a telescoping plug and socket fixture of conventional design. In this showing a length of rod 21 of larger cross section is shown as having a socket forming fitting 22 into which a plug forming fitting 23 carried by a smaller length of rod 24 may be fitted in telescoping relation. In this showing the flutings of the length of the rod 21, designated by the numeral 25, terminate at a point 26 which is short of the ends of the splines which go to make up this length and in like manner the length of the rod 24 is provided with flutings 27 which terminate at a point 28 which is short of the ends of the several splines which go to make up this latter length of the rod. With this construction the fitting carrying ends of the lengths 21 and 24 of the rod will be of solid construction and therefore lend themselves to a more firm mounting of the telescoping fittings 22 and 23 thereupon.

In order to explain the operation of my rod comparison will be made with the action which takes place in a so-called solid rod constructed of several splines and in which no internal flutings are provided. With such a rod it will be seen that when bent the curvature of the individual splines will be subjected to longitudinal and transverse stresses. For example, the outer spline in the curvature of the rod will be subjected to a stretching action while the innermost spline will be subjected to compression. At the same time, if it is assumed that the flexing takes place in the plane of two opposite flat surfaces of the rod the side splines will be stretched or compressed to a lesser degree than will be the outer and innermost splines of the rod and at the same time the glued surfaces between the several splines will be subjected to a shearing action which if carried to the breaking point will actually splinter the rod along these joints. As distinguished from this, when a rod is made up with the fluting and the resulting chamber or cavity extending completely therethrough, as contemplated by this invention, it will be seen that when the rod is subjected to a corresponding flexing the uppermost spline while subjected to a stretching action and the innermost spline while subjected to a compressive strain will because of their modified cross sectional areas also be subjected to a transverse stress. In other words, as is diagrammatically illustrated in Figure 7, a stretching of the uppermost spline in the curvature will tend to transversely bow this spline inwardly from its normal outer plane and at the same time the splines at the sides of the rod will be caused to bow outwardly between the glued surfaces at the sides thereof until the cross section of the rod will tend to take a shape somewhat corresponding to the cross section here illustrated in an extremely exaggerated manner. The action which takes place will be somewhat similar to that which would be found in the bending of a tubular metallic rod. Under these conditions each of the splines will be subjected to internal stresses that will act as a spring and store up energy which will have a tendency to return the individual splines to their normal shape and relation to each other immediately upon a release of any force which may be applied to effect a bending of the rod. In addition to relieving the top and bottom splines of excessive breaking stresses the transversely bowing of the side splines will also react upon the top and bottom splines of the rod and cause it to assume its normal unbent condition immediately upon a loss of the applied bending stresses and as a result the actual resilience and action of the rod will be increased to such an extent that the casting accuracy and distance attained by a user will be greatly increased.

While I have, for the sake of clearness and in order to disclose the invention so that the same can be readily understood, described and illustrated specific devices and arrangements, I desire to have it understood that this invention is not limited to the specific means disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is—

1. A split bamboo fly-casting rod, comprising a plurality of splines of trapezoidal cross-section joined together in coextending relation to form a hollow rod of polygonal form, characterized by the fact that each of said trapezoidal splines is provided with a centrally disposed longitudinally extending flute upon its inner surface, and the flute carried by each of said splines being of increasing depth relative to its width as the tip of the rod is approached.

2. A split bamboo fly-casting rod of tapering polygonal cross-section, comprising a plurality of splines of trapezoidal cross-section joined together in coextending relation to form a hollow rod, and characterized by the fact that the interior surface forming side of each of said splines is provided with a single longitudinally extending flute of non-uniformly varying width and depth throughout the length of the rod.

3. A fly-casting rod, comprising six splines of tapered trapezoidal cross-section secured together in coextending relation to form a hollow hexagonal rod, and characterized by the fact that the interior surface forming sides of each of said splines is routed out to different depths and widths to provide a groove having different configurations throughout the length of said rod to thereby produce a desired balance and action at different points along the rod without varying the external dimensions thereof.

4. The method of controlling the action of a split bamboo fly-casting rod, which comprises forming a rod of a plurality of segmental splines of trapezoidal cross-section, and varying the active cross-sectional area of said splines at different points throughout the length of the rod by cutting a continuous flute of non-uniformly varying width and depth upon the inner side of each of said splines throughout the active length of the rod.

5. The improvement for controlling the action of a hollow fly-casting rod formed of a plurality of segmental splines of trapezoidal cross-section glued together in the conventional manner, which comprises a plurality of splines of trapezoidal cross-section each having a longitudinally extending groove formed along the inner sides thereof, and in which the width and depth of said longitudinally extending grooves of said splines vary non-uniformly with respect to the uniformly varying outer dimensions of the rod to thus produce zones of desired stiffness, specific gravity and active cross-section at definite points along the length of the rod substantially as described.

6. The improvement in the manufacture of fly-casting rods for controlling the stiffness, specific gravity and active cross-section of a fly-casting rod at different points throughout its length in a non-uniform manner with respect to the uniformly varying outer dimensions of the rod, which comprises forming the fly-casting rod of segmental splines in which the apex of each of said segmental splines is cut off from a spline of trapezoidal cross-section, grooving the inner surface of each of said trapezoidal splines to provide a centrally disposed longitudinally extending flute of non-uniformly varying width and depth throughout the length of each of said splines, and finally gluing said splines together in the conventional manner to complete the rod.

LEWIS D. STONER.

REFERENCES CITED

The following references are of record in the file of this patent:

UNITED STATES PATENTS

| Number | Name | Date |
|---|---|---|
| Re. 18,365 | Anderson | Mar. 1, 1932 |
| 330,572 | Edwards | Nov. 17, 1885 |
| 1,293,208 | Ryan | Feb. 4, 1919 |
| 1,524,322 | Stolley | Jan. 27, 1925 |
| 1,748,223 | Herris | Feb. 25, 1930 |

FOREIGN PATENTS

| Number | Country | Date |
|---|---|---|
| 885,678 | France | of 1943 |

Certificate of Correction

January 9, 1951

Patent No. 2,537,488

LEWIS D. STONER

It is hereby certified that error appears in the printed specification of the above numbered patent requiring correction as follows:

Column 8, line 19, for the word "from" read *to form*;

and that the said Letters Patent should be read as corrected above, so that the same may conform to the record of the case in the Patent Office.

Signed and sealed this 6th day of March, A. D. 1951.

[SEAL]

THOMAS F. MURPHY,
*Assistant Commissioner of Patents.*